No. 616,918. Patented Jan. 3, 1899.
G. GODDU.
NAIL MAKING MACHINE.
(Application filed Feb. 26, 1898.)
(No Model.) 7 Sheets—Sheet 1.
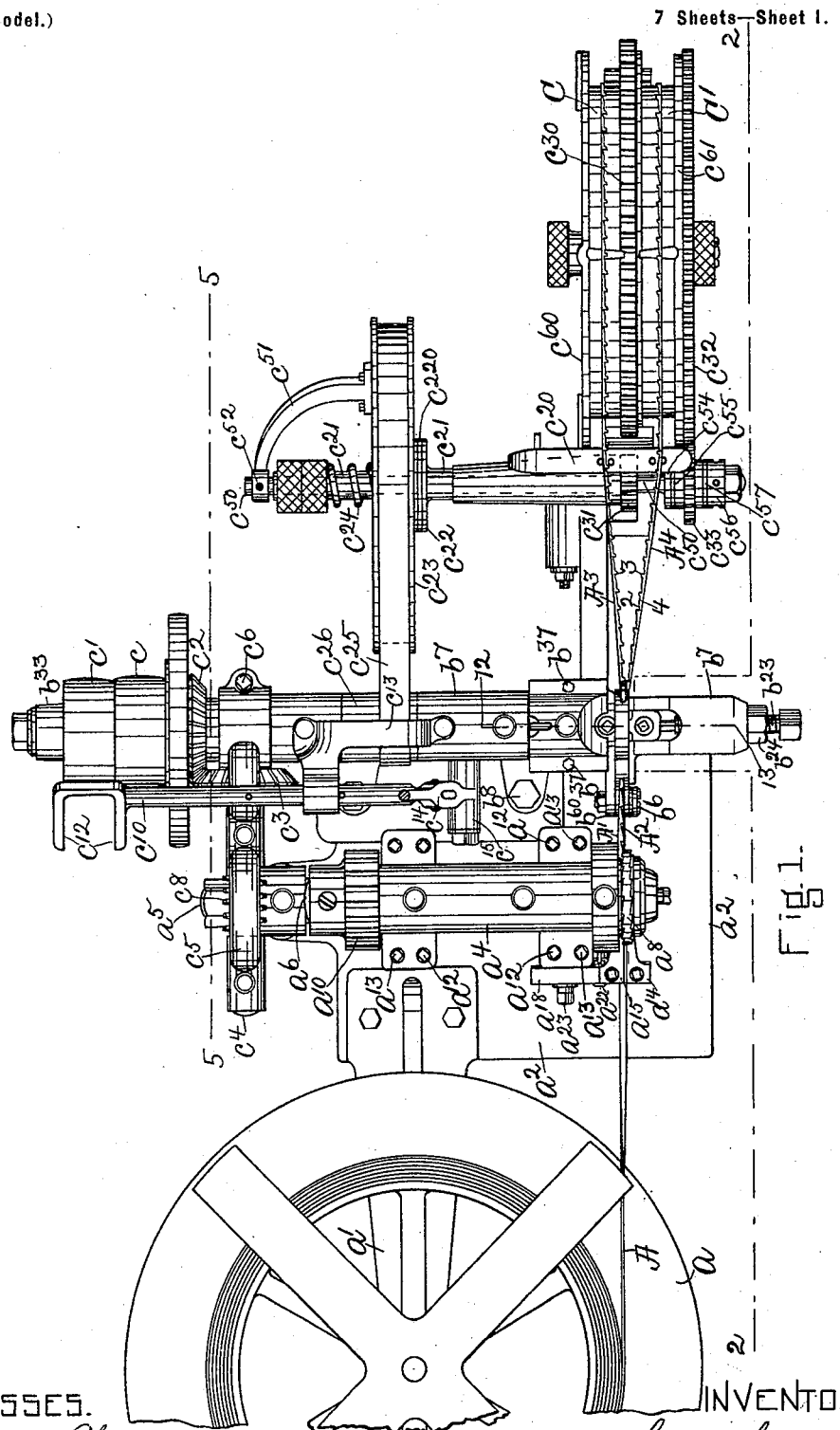
WITNESSES.
Matthew M. Blunt.
J. Murphy.
INVENTOR.
George Goddu
by Jas. H. Churchill
ATT'Y.

No. 616,918. Patented Jan. 3, 1899.
G. GODDU.
NAIL MAKING MACHINE.
(Application filed Feb. 26, 1898.)
(No Model.) 7 Sheets—Sheet 2.
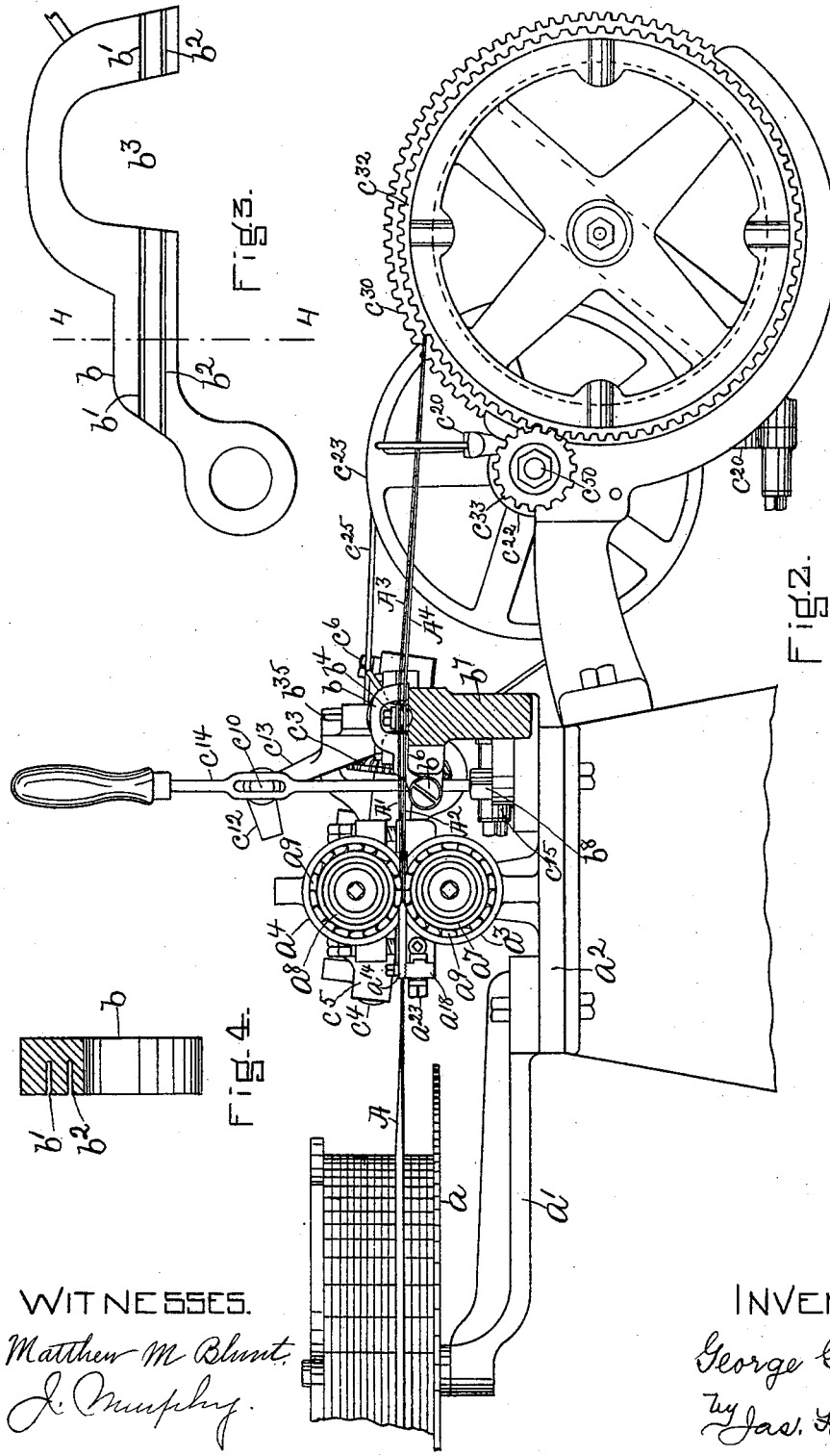
WITNESSES.
Matthew M Blunt.
J. Murphy.
INVENTOR.
George Goddu
By Jas. H. Churchill
ATT'Y.

No. 616,918. Patented Jan. 3, 1899.
G. GODDU.
NAIL MAKING MACHINE.
(Application filed Feb. 26, 1898.)
(No Model.) 7 Sheets—Sheet 3.

WITNESSES.
Matthew M. Blunt.
J. Murphy.

INVENTOR.
George Goddu
by Jas. H. Churchill
ATT'Y.

No. 616,918. Patented Jan. 3, 1899.
G. GODDU.
NAIL MAKING MACHINE.
(Application filed Feb. 26, 1898.)

(No Model.) 7 Sheets—Sheet 4.

WITNESSES.
Matthew M. Blunt.
J. Murphy

INVENTOR.
George Goddu
by Jas. H. Churchill
ATT'Y.

No. 616,918. Patented Jan. 3, 1899.
G. GODDU.
NAIL MAKING MACHINE.
(Application filed Feb. 26, 1898.)
(No Model.) 7 Sheets—Sheet 5.
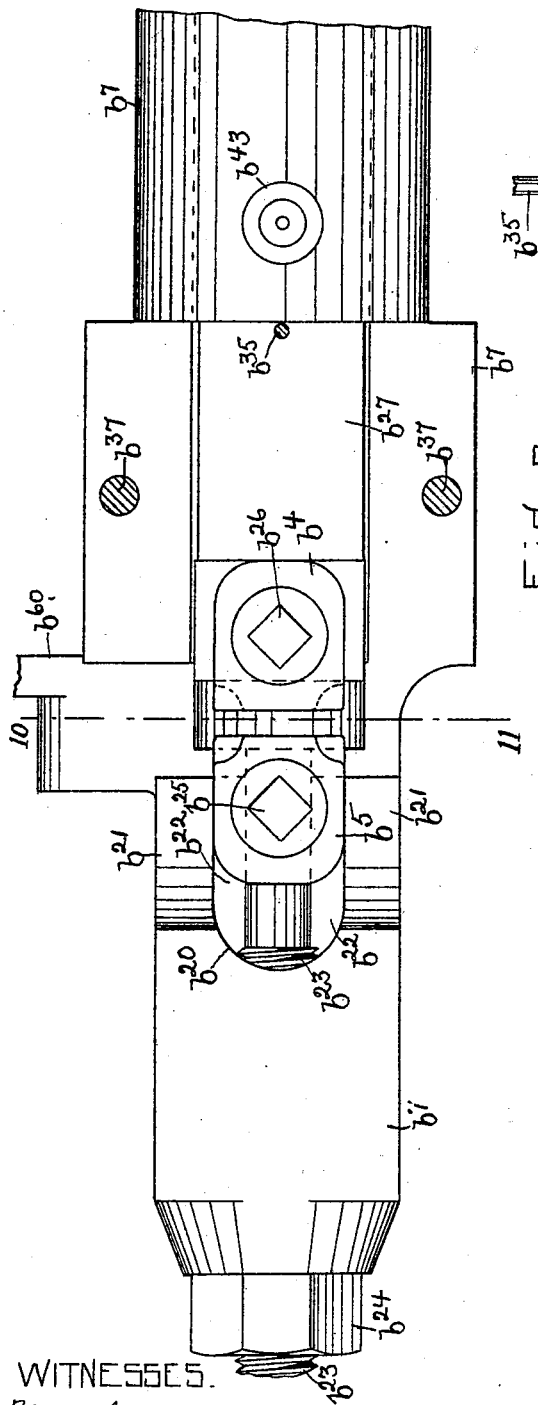
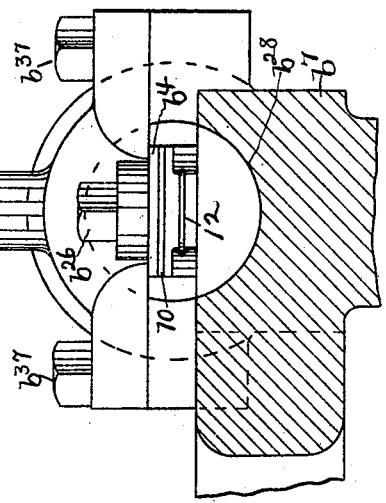
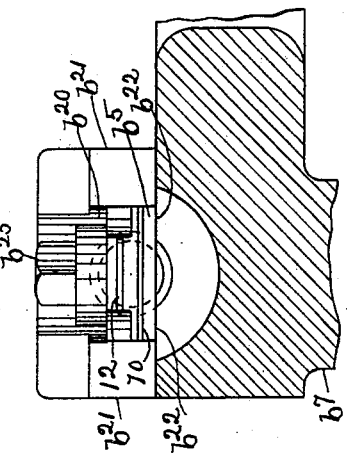
WITNESSES.
Matthew M. Blunt
J. Murphy
INVENTOR
George Goddu
by Jas. H. Churchill
ATT'Y No. 616,918. Patented Jan. 3, 1899.
G. GODDU.
NAIL MAKING MACHINE.
(Application filed Feb. 26, 1898.)
(No Model.) 7 Sheets—Sheet 6.
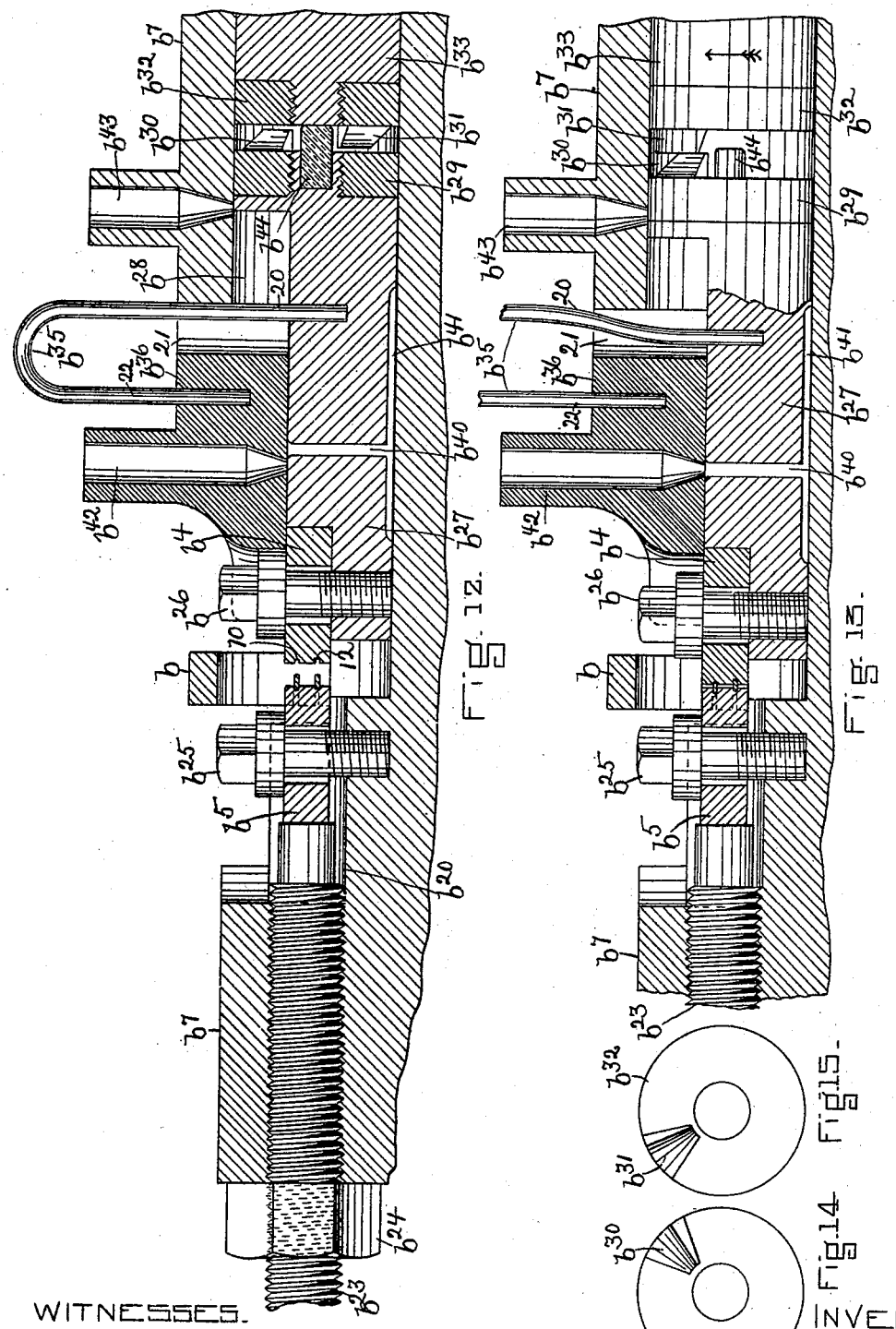
WITNESSES.
Matthew M Blunt.
J. Murphy
INVENTOR.
George Goddu
by Jas. H. Churchill
ATT'Y No. 616,918. Patented Jan. 3, 1899.
G. GODDU.
NAIL MAKING MACHINE.
(Application filed Feb. 26, 1898.)
(No Model.) 7 Sheets—Sheet 7.
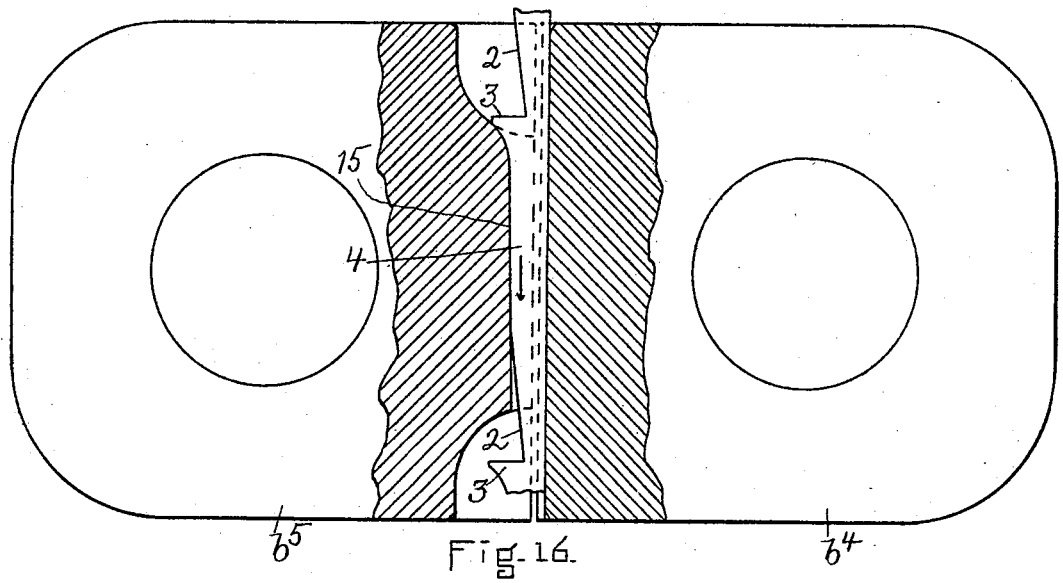
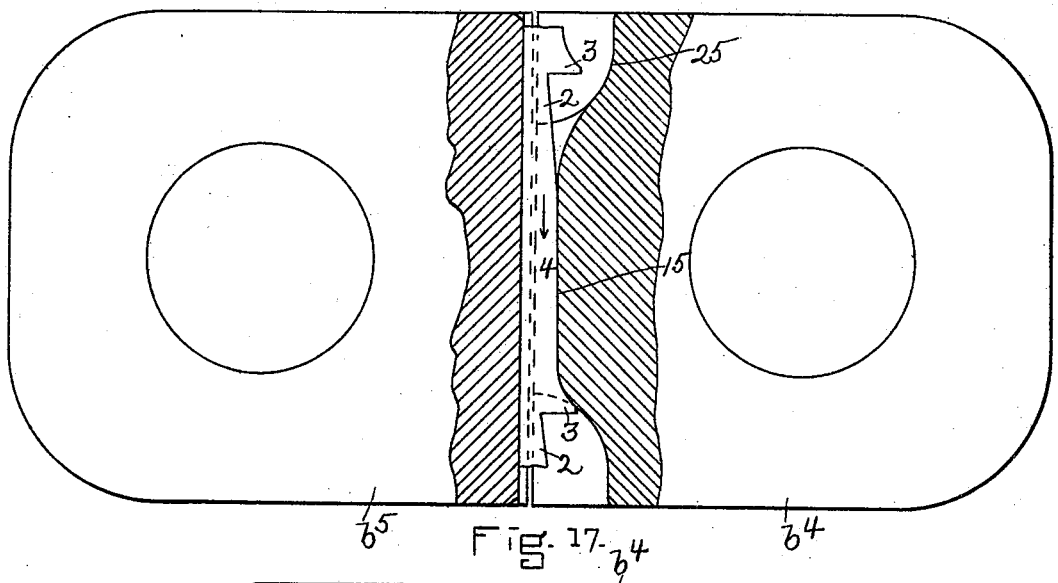
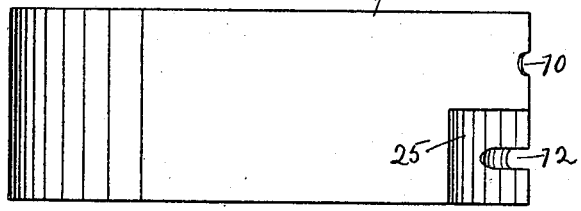
WITNESSES.
Matthew M. Blunt
J. Murphy
INVENTOR.
George Goddu
by Jas. H. Churchill
ATT'Y.

UNITED STATES PATENT OFFICE.

GEORGE GODDU, OF WINCHESTER, MASSACHUSETTS, ASSIGNOR TO THE GODDU SONS' METAL FASTENING COMPANY, OF PORTLAND, MAINE.

NAIL-MAKING MACHINE.

SPECIFICATION forming part of Letters Patent No. 616,918, dated January 3, 1899.

Application filed February 26, 1898. Serial No. 671,735. (No model.)

*To all whom it may concern:*

Be it known that I, GEORGE GODDU, of Winchester, county of Middlesex, and State of Massachusetts, have invented an Improvement in Nail-Making Machines, of which the following description, in connection with the accompanying drawings, is a specification, like letters and numerals on the drawings representing like parts.

This invention relates to a nail-making machine, and is herein shown as embodied in a machine for making string-nails substantially such as shown and described in United States application, Serial No. 654,974, filed by me October 12, 1897. The string-nails referred to are composed of a series of connected headed and pointed tapering nails having a compressed shank; and it is the object of this invention to provide a machine in which string-nails such as described may be formed quickly, accurately, and at a minimum expense.

Figure 5:
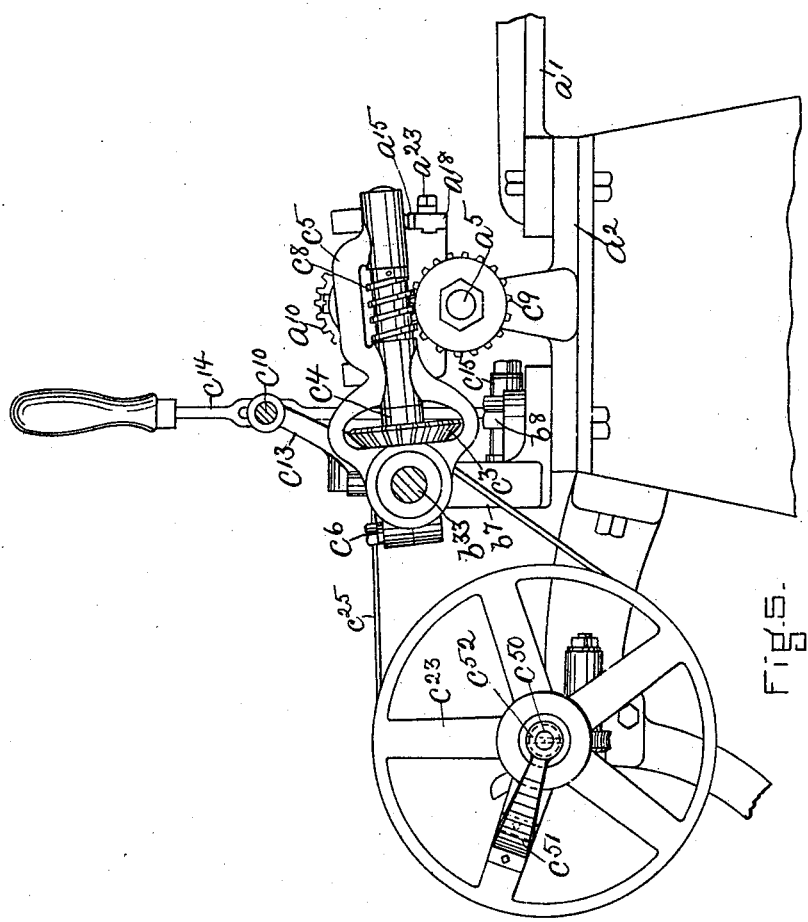
Figure 6:
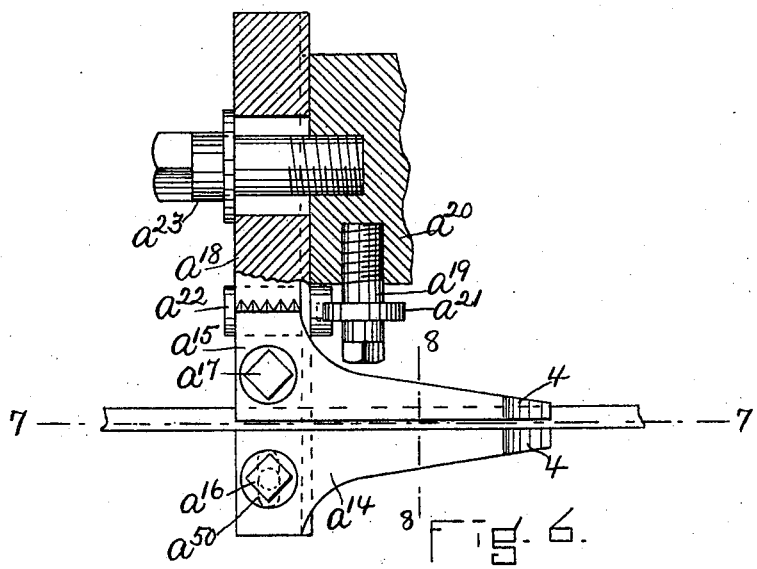
Figure 7:
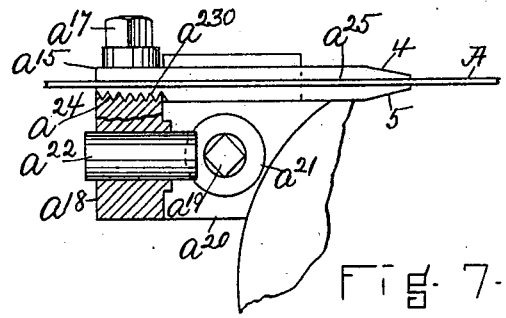
Figure 8:
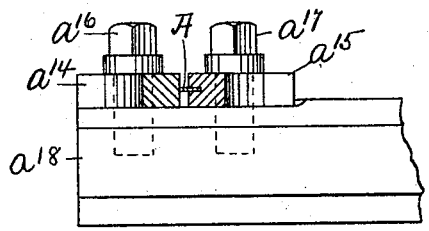

Figure 1 is a top or plan view of a nail-making machine embodying this invention; Fig. 2, a section and elevation of the machine shown in Fig. 1, the section being taken on the line 2 2, Fig. 1; Figs. 3 and 4, details to be referred to, Fig. 4 being a section on the line 4 4, Fig. 3; Fig. 5, a section and elevation of the opposite side of the machine shown in Fig. 1, the section being taken on the line 5 5; Figs. 6, 7, and 8, details of the guide for the ribbon or band, to be referred to; Figs. 9, 10, and 11, enlarged details to more clearly show the compressing-dies, Figs. 10 and 11 being sections on the line 10 11, Fig. 9, looking in opposite directions; Figs. 12 and 13, enlarged sectional details showing the compressing-dies in different positions, the section being taken on the line 12 13, Fig. 1; Figs. 14 and 15, details in elevation, to be referred to; Figs 16 and 17, enlarged details of the compressing-dies in their operative position; and Fig. 18, an end elevation, on an enlarged scale, of one of the compressing-dies.

In the present instance I have shown my invention as embodied in a machine adapted to cut a substantially thin narrow ductile ribbon or band A of metal, preferably steel, into duplicate string-nail blanks $A'$ $A^2$, each comprising a series of connected tapering nails, and to compress the individual tapered nails between their head and point to form completed string-nails $A^3$ $A^4$, comprising a series of connected nails having a ductile tapering pointed end 2, (see Figs. 1, 16, and 17,) a defined head 3, and an intermediate stiffened and hardened shank portion 4.

The ribbon or band A is shown as wound on a reel $a$, mounted on an arm $a'$, attached to a base or table $a^2$, which supports in suitable bearing-sleeves $a^3$ $a^4$ shafts $a^5$ $a^6$, upon which are fastened cutting-disks $a^7$ $a^8$, provided on their circumferential edges with substantially triangular recesses $a^9$, forming dies which have substantially long inclined and shorter transverse cutting edges to sever the band A into the duplicate string-nail blanks $A'$ $A^2$, substantially as more fully described in United States Patent No. 592,729, granted to me October 26, 1897. The shafts $a^5$ $a^6$ are geared together to rotate in opposite directions, only one gear $a^{10}$ being herein shown, (see Fig. 1,) and the sleeve $a^4$ is adjustable relatively to the sleeve $a^3$ by screws $a^{12}$ $a^{13}$, as described in the said patent.

The band A before it reaches the cutting-disks $a^7$ $a^8$ is passed through a combined support and guide, preferably of the construction shown in Figs. 6 to 8, inclusive. The guide referred to is composed of a movable member $a^{14}$ and a fixed member $a^{15}$, both of which are secured, as by screws $a^{16}$ $a^{17}$, to an adjustable support (shown as a bar $a^{18}$) laterally movable with relation to the plane in which the cutting-disks revolve, as herein shown, by means of an adjusting screw or bolt $a^{19}$, movable in a socket in a bracket or fixed portion $a^{20}$ of the framework of the cutting portion of the machine and provided with a collar $a^{21}$, which enters a slot in the end of a pin $a^{22}$, extended through the bar $a^{18}$, which latter is dovetailed into said bracket and is adapted to be secured in its adjusted position by a clamping bolt or screw $a^{23}$.

The lower surfaces of the members $a^{14}$ $a^{15}$ are provided with serrations or teeth $a^{230}$ (see Fig. 7) to engage like serrations or teeth $a^{24}$ in the upper surface of the bar $a^{18}$, which teeth or serrations act as keys to insure the edges of the guides being in perfect alinement with the cutting-disks. The member $a^{14}$ is provided with a slot $a^{50}$, (see dotted lines, Fig. 6,) through which the bolt or screw $a^{16}$ extends and which permits adjustment of the member $a^{14}$ with relation to the member $a^{15}$. The fixed member $a^{15}$ may be provided with a slot or groove $a^{25}$ in its side or face adjacent to the movable member of a depth sufficient to support the band A and preferably substantially one-half or more of the width of said band, and the adjacent side or face of the member $a^{14}$ may be made straight and without a corresponding groove or slot, as shown in Fig. 8.

The members $a^{14}$ $a^{15}$ preferably have their upper and lower surfaces beveled or tapered at their outer end, as at 4 5, (see Fig. 7,) so that they may be extended close up to the active die of the cutting-disks to firmly support the band or ribbon and insure proper cutting of the nail-blanks A' A².

The string-nail blanks A' A² after leaving the cutting-disks are passed through a guide preferably of the construction herein shown (see Fig. 2, 3, and 4) and which consists of a yoke-shaped bar $b$, provided with longitudinal slots, channels, or guideways $b'$ $b^2$ one above the other and the continuity of which is interrupted by a space $b^3$ of a width substantially equal to or greater than the width of the compressing or swaging dies $b^4$ $b^5$ (see Figs. 9, 10, and 11) and which will be more specifically described hereinafter.

The guide-bar $b$ is herein shown as pivoted, as at $b^6$, (see Figs. 1 and 2,) to a stationary part of the framework, shown as an arm or bracket $b^{60}$, attached to an upright frame, casting, or bearing $b^7$, secured to the table $a^2$, as by screws $b^8$, (see Fig. 1,) and the said guide-bar is thus rendered capable of being turned upon its pivot to obtain access to the swaging-dies $b^4$ $b^5$ when so desired.

The swaging-dies $b^4$ $b^5$ may and preferably will be made so as to simultaneously compress an individual nail of each of the string-nail blanks A' A² for a portion of its length, at the widest portion, and preferably the active or compressing portions of the said dies are made of less length than the length of the individual nails of the string-nail blanks A' A², so that the said blanks may be compressed for a portion only of their length from or near their head toward but not to the point, whereby the individual nails of the string-nail blanks A' A² are provided with a defined head 3, a compressed shank portion 4 of greater stiffness or hardness than the original nail-blank, and a tapering point or end portion 2, which is left of the original ductility of the nail-blank and of the band or ribbon from which the said nail-blank is cut.

The swaging-dies $b^4$ $b^5$ (shown best in Figs. 9, 10, 11, 16, 17, and 18) are composed of two metal blocks having their adjacent faces substantially straight and each provided, as shown, with two guideways, channels, or grooves 10 12, of unequal depth and different shape, one of the grooves, as 10, being made of substantially uniform depth and extended the width of the dies, and the other groove or channel, as 12, being made of unequal depth, extended but a portion of the width of the die, and made of the proper or desired shape, which in the present instance is slightly tapering, so as to make contact with the portion of the nail-blank to be compressed. The dies $b^4$ $b^5$ are set with the groove 10 in one die opposite and in line with the groove 12 of the other die, and vice versa, which arrangement enables the individual nails of the string-nail blanks A' A² to be simultaneously compressed. The grooves 10, of substantially uniform depth, receive the substantially straight side of the nail-blank, while the shorter grooves 12 receive the tapering side of said nail-blank, as clearly illustrated in Figs. 12, 13, 16, and 17. The active portion of the grooves 12 is marked 15 in Figs. 16 and 17.

By reason of the band A being cut into duplicate string-nail blanks A' A² one of said blanks—for instance, A'—is fed through the guide-bar $b$ with the narrow or pointed end first, whereas the other string-nail blank A² is fed forward with the widest portion or head first, and to avoid any danger of the wide portions or heads of the nails of the blank A² striking the end of the die $b^4$ the said die is provided at its end with an enlarged recess 25, (see Figs. 17 and 18,) which communicates with the groove 12, and the said recess is curved toward the said groove, so that in case the head of a nail of the blank A² strikes the curved recess 25 it will be guided into said groove.

The dies $b^4$ $b^5$ are preferably both adjustable with relation to each other and to the guideways $b'$ $b^2$ in the guide $b$, and in the present instance one of the dies, as $b^5$, is rendered stationary in its adjusted position, and the other die, as $b^4$, is movable toward and from the fixed die to impart to the string-nail blanks A' A² the necessary blow to effect the compression of the said blanks to form the completed string-nails A³ A⁴.

Referring to Figs. 1, 9, 10, 11, 12, and 13, the upright frame or casting $b^7$ is provided at its outer or front end with a recess $b^{20}$, having side walls $b^{21}$, provided with ledges or shoulders $b^{22}$, upon which the die $b^5$ rests and is adapted to be moved by an adjusting screw or rod $b^{23}$, provided with a lock-nut $b^{24}$, the said die being firmly held down on said shoulders in its adjusted position by a clamping-screw $b^{25}$. (See Fig. 13.) The movable die $b^4$ is secured by a clamping-screw $b^{26}$ to a block or carrier $b^{27}$, movable in an opening or bore $b^{28}$ in the rear portion of the upright frame $b^7$, the said carrier, as shown, (see Figs. 12 and 13,) having a cylindrical rear portion or head $b^{29}$, preferably detachably secured to said carrier and provided with a lug or projection $b^{30}$, having an inclined or beveled surface with which coöperates an inclined or beveled surface on a lug or projection $b^{31}$ on a head $b^{32}$, detachably secured to a shaft $b^{33}$, extended through the upright frame or casting $b^7$.

The carrier $b^{27}$ for the movable die $b^4$ is adapted to be moved forward once for every revolution of the shaft $b^{33}$—namely, by the cam or inclined lug $b^{31}$ acting on the cam projection or lug $b^{30}$—and when the cam $b^{31}$ has passed out of engagement with the lug or cam $b^{30}$ the carrier $b^{27}$ may be returned to its normal position, preferably, as herein shown, by means of a spring $b^{35}$, which is shown as a bent wire rod, having one end 20 inserted through an opening 21 in a cap $b^{36}$ and into an opening or socket in the die-carrier $b^{27}$, (see Figs. 12 and 13,) the other end 22 of said spring-rod being inserted into a socket in the cap $b^{36}$, which latter is detachably secured, as by screws $b^{37}$, to the upright frame or casting $b^7$. The die-carrier $b^{27}$ may and preferably will be provided with an oil-passage $b^{40}$, communicating with a recess $b^{41}$ in the under side of said carrier and adapted to communicate with an oil-supply duct or well $b^{42}$ in the cap $b^{36}$. The casting or upright $b^7$ may also be provided with an oil duct or well $b^{43}$, located substantially above the head $b^{29}$. The return movement of the die-carrier $b^{27}$ by the spring $b^{35}$ may be cushioned by a buffer $b^{44}$, of rubber or other suitable material, which is adapted to strike against the end of the shaft $b^{33}$. In the present instance the shaft $b^{33}$ is represented as the main shaft of the machine, it being provided with a fast pulley $c$ and a loose pulley $c'$, (see Fig. 1,) adapted to be driven by a belt. (Not herein shown.)

The cutting-disks $a^7$ $a^8$ may and preferably will be driven from the main shaft $b^{33}$, which may be accomplished by the mechanism herein shown, which consists of the bevel-gear $c^2$ on the shaft $b^{33}$, meshing with the bevel-gear $c^3$ on a shaft $c^4$, having bearings in a frame or bracket $c^5$, detachably secured to the upright or casting $b^7$, as by screw $c^6$, (see Figs. 1 and 5,) the shaft $c^4$ having a worm $c^8$, which meshes with a worm-gear $c^9$, fast on the shaft $a^5$, carrying the cutting-disk $a^7$, the shaft $a^5$ having a gear (not shown) which meshes with the gear $a^{10}$ on the shaft $a^6$ of the cutting-disk $a^8$, as in the Patent No. 592,729, above referred to.

The machine may be provided with a belt-shipper, shown as a rod $c^{10}$, having forks or arms $c^{12}$ and adapted to slide in a bracket or arm $c^{13}$, attached to the upright frame or casting $b^7$, the said rod being actuated by a lever $c^{14}$, pivoted, as at $c^{15}$.

The completed string-nails $A^3$ $A^4$ are adapted to be wound upon separate reels C C' and to be laid thereon by a reciprocating traverse $c^{20}$, which latter and the reel C are actuated from a counter-shaft $c^{21}$, which is provided with a friction clutch or tension device consisting of the disk $c^{22}$, a leather washer $c^{220}$, and pulley $c^{23}$, which parts are held in engagement by a spring $c^{24}$, substantially as shown and described in the Patent No. 592,729, referred to. The pulley $c^{23}$ in the present instance is driven by a belt $c^{25}$, passed about a pulley or hub $c^{26}$, fast on the main shaft $b^{33}$.

In the Patent No. 592,729 referred to both reels C C' are rotated by a single large gear $c^{30}$ in mesh with a pinion $c^{31}$ on the shaft $c^{21}$, and in the present instance a second gear $c^{32}$ and pinion $c^{33}$ are also employed, the gear $c^{32}$ being fast to the reel C', and the pinion $c^{33}$ being loose on a second shaft or spindle $c^{50}$, extended loosely through the shaft $c^{21}$ and driven by the pulley $c^{23}$, to which the shaft $c^{50}$ is secured, so as to revolve therewith, by an arm $c^{51}$, the shaft $c^{50}$ being fastened to the arm $c^{51}$ by a pin $c^{52}$ or in any other suitable or desired manner. The loose pinion $c^{33}$ is driven by a tension device consisting, as herein shown, (see Fig. 1,) of a disk $c^{54}$, fast on the shaft $c^{50}$, a washer $c^{55}$, a nut $c^{56}$, and a washer $c^{57}$.

By reference to Fig. 1 it will be seen that the reels C C' are on opposite sides of a straight line through the guide $b$, and consequently as the traverse reciprocates to lay the string-nails $A^3$ $A^4$ on the reels C C' the said string-nails are placed under greater tension as the traverse moves away from said straight line—that is, as the string-nail $A^3$ is laid on the reel C toward its flange $c^{60}$ the tension on said string-nail is increased, while at the same time the tension on the string-nail $A^4$ is diminishing, owing to its being laid on the reel C' from the flange $c^{61}$ toward the said straight line. It follows, then, that the tension on the string-nails $A^3$ $A^4$ as they are wound on their respective reels is not the same for both at each movement of the traverse, and to avoid one string-nail being wound into a tight coil and the other into a loose coil and also to insure that the tension on the string-nails shall not become sufficient to break either of the string-nails the tension devices are provided, one for each reel. The tension devices operate in such manner that as the tension on the string-nails increases the reels will be driven at a slower speed, owing to the friction-washers permitting the shaft $c^{21}$ and the gear $c^{33}$ to slip.

The rotation of the cutting-disks $a^7$ $a^8$ and the movement of the die-carrier $b^{27}$ are properly timed so as to insure the proper portion of the nail-blank being in the required position before the swaging or compressing operation takes place.

In operation with the machine herein shown the ribbon or band A is severed into duplicate string-nail blanks A' $A^2$, which are passed through the guide $b$ and are acted upon by the compressing or swaging dies $b^4$ $b^5$ to compress the individual nails of the string-nail blank for a portion of their length, so as to stiffen and harden the said nail-blanks and form a completed string-nail having a stiffened shank portion 4, a well-defined head 3, and a ductile point 2. In the present instance the swaging-dies $b^4$ $b^5$ are shown as constructed to compress the metal and define the head on one side only; but it is evident that the said dies may be changed or different dies used, so as to compress the metal and define the head on both sides of the nail-blank, and so also the said dies may be shaped so as to impart any desired form to the compressed portion, continuous or otherwise.

I have herein shown what I regard as a superior form and construction of machine for producing string-nails such as herein described, and which machine comprises a cutting portion, a swaging or compressing portion, and a winding portion; but I do not desire to limit my invention to a machine embodying all three portions, as the winding portion might be omitted, and also the cutting portion might be changed and used in conjunction with the compressing portion—that is to say, the cutting portion might be changed so that only a single string-nail blank is formed, which is then acted upon by the compressing portion; and although I am of the opinion that such a machine would be commercially inferior to the machine herein shown I still regard it as within the scope of this invention.

In the machine herein shown the cutting-disks $a^7$ $a^8$ also act to feed the ribbon or band A, and the speed of rotation of the reels C C' is regulated by the tension devices, so as to maintain the string-nails substantially taut between the cutting mechanism and the said reels, and also the operations of the cutting mechanism. The compressing mechanism and the winding mechanism are timed with relation to one another, so as to insure the compression of the proper portion of the nail-blanks.

The machine herein shown and described is adapted to form string-nails having their individual nails of a predetermined length; but string-nails with any desired length of individual nails may be made by substituting for the cutting-disks $a^7$ $a^8$ other cutting-disks having dies of the proper or desired length and substituting for the worm-gear $c^9$ another worm-gear of the proper or desired size to effect the feed of the string-nail blanks in time with the operation of the compressing-dies, so that the latter may act on the proper or desired part of the individual nails of the string-nail blanks.

I claim—

1. In a nail-making machine, the combination of the following instrumentalities, viz: a cutting mechanism adapted to form a string-nail blank comprising a series of connected tapered nails, and a compressing or swaging mechanism constructed to act on a portion only of the tapered nails and compress them intermediate of their opposite ends, for the purpose specified.

2. In a nail-making machine, the combination of the following instrumentalities, viz: a cutting mechanism adapted to form a string-nail blank comprising a series of connected tapered nails, a compressing or swaging mechanism constructed to act on the wider portion of the tapered nails and compress them intermediate of their opposite ends, and a guide for the nail-blank intermediate of the said cutting and compressing mechanisms, and through which the string-nail blank is fed to the compressing mechanism, substantially as described.

3. In a nail-making machine, the combination of the following instrumentalities, viz: a cutting mechanism constructed to cut a substantially flat band or ribbon into two string-nail blanks, each comprising a series of connected tapering nails, and a compressing mechanism comprising a fixed and a movable die adapted to act on both string-nail blanks simultaneously and constructed to compress the tapered side of the nails of said string-nail blanks for a portion only of their length, and means to operate said movable die, substantially as described.

4. In a nail-making machine, the combination of the following instrumentalities, viz: a cutting mechanism comprising rotatable cutting-disks provided with peripheral dies having longer inclined and shorter transverse cutting edges, and a compressing mechanism comprising a fixed die, a movable die, a rotatable shaft to effect movement of the movable die in one direction, means to move said die in the opposite direction, and gearing connecting said rotatable shaft to the shaft of one of said rotatable cutting-disks, substantially as described.

5. In a nail-making machine, the combination of the following instrumentalities, viz: a cutting mechanism constructed to form a string-nail blank composed of a series of connected tapering nails, and a compressing mechanism adapted to operate on the tapered nails of the said string-nail blank and compress the tapered side of the nail intermediate of its opposite ends for a portion only of its length, for the purpose specified.

6. In a nail-making machine, the combination of the following instrumentalities, viz: a compressing mechanism comprising a fixed die, a movable die, a carrier for said movable die provided at one end with a cam or projection, a rotatable shaft substantially in line with said carrier and provided on its front end with a cam or projection to engage the cam on said die-carrier to move the same and its attached die longitudinally toward the fixed die, and means to move said carrier in the opposite direction, substantially as described.

7. In a nail-making machine, the combination of the following instrumentalities, viz: a compressing mechanism comprising coöperating dies, a carrier for one of said dies, a rotary shaft substantially in line with said carrier, and means interposed between the abutting ends of said shaft and carrier and operated by said rotary shaft to impart longitudinal movement to said carrier away from but in substantially an axial line with said shaft, substantially as and for the purpose specified.

8. In a nail-making machine, the combination of the following instrumentalities, viz: a cutting mechanism, constructed to form a string-nail blank composed of a series of connected tapering nails, a compressing mechanism adapted to operate on the tapered nails of the said string-nail blank and compress the tapered side of the nail between its opposite ends for a portion only of its length to form a nail having a stiffened shank portion, a defined head and a ductile point, and a guide for the string-nail on opposite sides of the compressing mechanism, substantially as described.

9. In a nail-making machine, the combination of the following instrumentalities, viz: a cutting mechanism comprising rotary cutting-disks having peripheral dies coöperating to sever a metal band or ribbon into duplicate string-nail blanks, each comprising a series of connected tapering nails, a compressing mechanism comprising coöperating dies shaped to compress the tapered side of the nails of both string-nail blanks, a carrier for one of said dies, and means to reciprocate said carrier in time with the rotation of the cutting-disks, substantially as described.

10. In a nail-making machine, the combination of the following instrumentalities, viz: a cutting mechanism comprising rotary cutting-disks having peripheral dies coöperating to sever a metal band or ribbon into duplicate string-nail blanks, each comprising a series of connected tapering nails, a compressing mechanism comprising coöperating dies shaped to compress the tapered side of the nails of both string-nail blanks, a carrier for one of said dies, a rotary shaft provided with a cam to effect longitudinal movement of the said die-carrier, and gearing connecting said rotary shaft with one of the shafts upon which the cutting-disks are mounted, substantially as described.

11. In a nail-making machine, the combination of the following instrumentalities, viz: a cutting mechanism comprising rotary cutting-disks having peripheral dies coöperating to sever a metal band or ribbon into duplicate string-nail blanks, each comprising a series of connected tapering nails, a compressing mechanism comprising coöperating dies shaped to compress the tapered side of the nails of both string-nail blanks, a carrier for one of said dies, and means to reciprocate said carrier in time with the rotation of the cutting-disks, and a guide for the string-nail blanks having slots or channels arranged one above the other, substantially as described.

12. In a nail-making machine, the combination of the following instrumentalities, viz: a cutting mechanism constructed to cut a substantially flat band or ribbon into two string-nail blanks, each comprising a series of connected tapering nails, and a guide for the said ribbon or band comprising the members $a^{15}$ $a^{14}$ separated by a space and one of which is adjustable toward the other, one of said members having a slot or groove for the reception of the band and the other having a plain face with which said band makes contact, substantially as described.

13. In a nail-making machine, the combination of the following instrumentalities, viz: a cutting mechanism constructed to cut a substantially flat band or ribbon into two string-nail blanks, each comprising a series of connected tapering nails, a guide for the said ribbon or band comprising the members $a^{15}$, $a^{14}$ between which the said band or ribbon is passed, a bar $a^{18}$ to which said members are secured, and an adjusting device for said bar consisting of a pin $a^{22}$ provided with a slot, and a screw $a^{19}$ having a collar which engages the slot in said pin, substantially as described.

14. In a nail-making machine, the combination of the following instrumentalities, viz: a cutting mechanism constructed to cut a substantially flat band or ribbon into two string-nails, and a winding mechanism comprising two reels, one for each string-nail, a traverse coöperating with said reels to lay the string-nails thereon, a driving mechanism for each reel, and a separate tension device for said driving mechanisms for the purpose specified.

15. In a nailing-machine, the combination of the following instrumentalities, viz: a cutting mechanism comprising cutting-disks mounted upon rotatable shafts, a compressing mechanism comprising coöperating dies, a carrier for one of said dies, a rotary shaft to operate said carrier, a worm-shaft geared to the die-operating shaft and provided with a worm, and a worm-gear mounted on one of the shafts of the cutting-disks and meshing with the said worm, substantially as described.

In testimony whereof I have signed my name to this specification in the presence of two subscribing witnesses.

GEORGE GODDU.

Witnesses:
JAS. H. CHURCHILL,
J. MURPHY.